United States Patent
Boylan et al.

(10) Patent No.: US 6,374,107 B1
(45) Date of Patent: Apr. 16, 2002

(54) LOCAL SCP FOR A MOBILE INTEGRATED INTELLIGENT NETWORK

(75) Inventors: Cornelius Boylan, Geilenkirchen; Peter Kobriger, Aachen, both of (DE); John den Ridder, Maastrich (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/354,717

(22) Filed: Jul. 16, 1999

(30) Foreign Application Priority Data

Jul. 17, 1998 (DE) .......................................... 198 32 302

(51) Int. Cl.[7] ................................................ H04B 7/06
(52) U.S. Cl. ........................ 455/432; 455/428; 455/456; 246/3
(58) Field of Search ................................ 455/414, 418, 455/424, 425, 428, 432, 433, 445, 459, 458, 436, 426, 456, 439; 246/3, 2 R, 59, 62

(56) References Cited

U.S. PATENT DOCUMENTS 4,711,418 A * 12/1987 Aver, Jr. et al. ................. 246/5
5,346,163 A * 9/1994 Momma et al. ................. 246/5
5,533,695 A * 7/1996 Heggestad et al. ........... 246/62

(List continued on next page.)

OTHER PUBLICATIONS

"European Digital Cellular Telecommunications System (Phase 2); Stage 1 Description of Unstructured Supplementary Service Data (USSD) (GSM 02.90)", European Telecommunication Standard Institute, Mar. 1994.

"European Digital Cellular Telecommunications System (Phase 2); Unstructured Supplementary Service Data (USSD)—Stage 3 (GSM 04.90)", European Telecommunication Standard Institute, Nov. 1994.

"Digital Cellular Telecommunications System (Phase 2); Unstructured Supplementary Service Data (USSD)—Phase 2 (GSM 03.90)", European Telecommunication Standard Institute, Jan. 1996.

Geier, U., Hätty, B.: "Funksystem Für Die Bahn"; Funkschau & Entwicklung 1997, vol. 11, pp. 72, 73.

ITU–T Recommendation Q.1204, International Telecommunication Union, General Recommendations on Telephone Switching and Signalling, Intelligent Network Distributed Functional Plane Architecture, 03/93.

Paul van Hal, et al., "Service Script Interpreter, an Advanced Intelligent Network Platform," Ericsson Review 67, No. 1, 1990, pp. 12–22.

Fredrik Ljungblom, "A Service Management System for the Intelligent Network," Ericsson Review 67, No. 1, 1990, pp. 32–41.

Lennart Söderberg, "Architecture for Intelligent Networks," Ericsson Review 66, No. 1, 1989, pp. 13–22.

(List continued on next page.)

Primary Examiner—William Trost
Assistant Examiner—Congvan Tran
(74) Attorney, Agent, or Firm—Burns, Doane, Swecker & Mathis, L.L.P.

(57) ABSTRACT

To provide a mobile integrated intelligent network as basis for a pan-European universal railway communication system wherein a local control is enabled for subscribers roaming internationally it is proposed to provide a service switching means (SSF) for this mobile integrated intelligent network with an interrogation means (24) adapted to receive at least a routable number from a service control unit (14) in accordance with a functional number supplied thereto. Further, the service switching unit (SSF) comprises an address storage unit (26; 34-1, . . . , 34-n) storing an address of the service control unit (14) such that the interrogation is directed to a local service control unit (14) in the event of international roaming.

14 Claims, 11 Drawing Sheets

U.S. PATENT DOCUMENTS

| | | | |
|---|---|---|---|
| 5,566,235 A | | 10/1996 | Hetz |
| 5,749,053 A | | 5/1998 | Kusaki et al. |
| 5,826,195 A | * | 10/1998 | Westerlage et al. .......... 455/456 |
| 5,915,008 A | * | 6/1999 | Dulman ....................... 379/201 |
| 5,970,408 A | * | 10/1999 | Carlsson et al. ............. 455/439 |
| 6,006,094 A | * | 12/1999 | Lee ............................. 455/445 |
| 6,075,853 A | * | 6/2000 | Boeckman et al. .......... 379/207 |
| 6,084,875 A | * | 7/2000 | Forrest ........................ 370/355 |
| 6,134,315 A | * | 10/2000 | Galvin ......................... 379/219 |
| 6,134,433 A | * | 10/2000 | Joong et al. ................. 455/417 |
| 6,134,438 A | * | 10/2000 | Sawyer ........................ 455/433 |
| 6,148,070 A | * | 11/2000 | Meek et al. .................. 379/210 |
| 6,148,193 A | * | 11/2000 | Miska et al. ................. 455/410 |

OTHER PUBLICATIONS

Masanobu Fujioka, et al., "Hierarchical and Distributed Information Handling for UPT," IEEE Network, The Magazine of Computer Communications, vol. 4, No. 6, Nov. 1, 1990, pp. 50–60.

Martin Frömel, "Bahn Frei Für GSM. GSM–Railway—Technik und Anwendungen," vol. 52, No. 12, 1998, pp. 54–57.

W. Lautenschlager, et al., "Routing Service for the Provision of Number Portability," World Telecommunication Congress, Global Network Evolution: Convergence or Collision? Toronto, Sep. 21–26, 1997, vol. 2, Sep. 21, 1997, pp. 235–242.

\* cited by examiner

LOCAL SCP FOR A MOBILE INTEGRATED INTELLIGENT NETWORK

FIELD OF THE INVENTION

The present invention relates to a service switching means for a mobile integrated intelligent network and further to a service control means for such a mobile integrated intelligent network.

In particular, the present invention relates to a mobile integrated intelligent network wherein the service switching means interacts with a local service control means in the event of international roaming.

TECHNICAL BACKGROUND OF INVENTION

Recently, a standard called EIRENE was created by a group of European railway operators in order to specify and standardize a pan-European universal railway communication system as private networks or virtual private networks with the intention to satisfy all operative railway communication means on a single mobile cellular network platform, e.g., the GSM platform.

A vital part of railway communication relates to a functional numbering and functional number registration. Here, the concept of functional numbers is introduced with the intention of releasing railway operative personnel of having to resort to temporary look-up tables when they want to contact a train currently roaming in the related railway operation range. Heretofore, there is specified a numbering plan based on train numbers and other running stock numbers. Typically, the mobile station number MSISDN assigned to a train driver is registered in relation to the train number he is currently driving.

FIG. 7 shows the concept of a gateway node initially introduced. In particular, it was proposed that a gateway node 100 would take over the task to translate the functional number supplied by a switch 102 into the actual routable mobile station number MSISDN of the destination. Thus, using the concept of a gateway node a call is routed to this gateway node 100 wherein a number of translations takes place to achieve a certain service. However, the use of such a gateway node arrangement quickly became obsolete due to various reasons including extra hardware costs and transmission costs.

An alternative to the concept of a gateway node relies on the implementation of mobile integrated intelligent networks, as will be shown in the following.

FIG. 8 shows a schematic diagram according to the general architecture of intelligent network communication systems. As shown in FIG. 8, there is provided a service control point 104 to control the switching of messages in the intelligent network communication system. Further, there are provided service switching functions 106 triggering calls/messages and invoking a re-routing of calls and messages to the service control point 104 for analysis.

As also shown in FIG. 8, the service switching function 106 is linked to an intelligent peripheral 108 or equivalently a terminal unit which implements specialized functions required for intelligent network communication services. The service control point 104 may also be linked to a service administration system 110 that provides the design environment for the creation of service logic.

During operation after a message has been triggered in the service switching function 106 a request for instructions is sent from the service switching function 106 to the service control point 104. Then, the service control point 104 performs service control in response to the request with instructions back to the service switching function 106 forwarding the service to the intelligent peripheral 108.

The general architecture of the intelligent network concept IN is, e.g., defined by ITU-TS in the recommendation Q.1204. While in the following, the functional entities are only described as far as the present invention is concerned, further details may be taken from references van Hal, P., van der Meer, J. and Salah, N.: "The Service Script Interpreter, an Advanced Intelligent Network Platform", Ericsson Review 67 (1990): 1, pp. 12–22, Ljungblom, F.: "A Service Management System for the Intelligent Network", Ericsson Review 67 (1990): 1, pp. 32–41, and Söderberg, L.: "Architecture for Intelligent Networks", Ericsson Review 66 (1989): 1, pp. 13–22 and enclosed herein by reference.

The architecture of the intelligent network shown in FIG. 8 may be integrated into a cellular mobile network, e.g., the GSM cellular mobile network, as explained in the following with respect to FIG. 9.

Typically, each cellular mobile network allows its users to initiate and receive calls and services, respectively, at any geographical area within the radio coverage of the home public land mobile network HPLMN operated by the network operator selected through the subscriber and also within the radio coverage areas of partners of the network operator providing services in visited public land mobile networks VPLMN.

As shown in FIG. 9, a link between different public land mobile networks or to any other network, e.g., the public switched telephone network PSTN is achieved through a gateway mobile services switching center GMSC. This gateway mobile services switching center GMSC is connected to a functional unit called home location register HLR where both, subscriber information and mobile information, are stored to allow incoming calls to be routed to a mobile station MS. To this end, the gateway mobile services switching center GMSC is also connected to a mobile services switching center MSC through which the mobile station MS can receive a service. This mobile service switching center MSC performs the necessary switching functions required for mobile stations MS covered by this particular mobile services switching center MSC.

Heretofore, the mobile service switching center MSC is also connected to a visitor location register VLR that dynamically stores mobile station information, such as the location area in case the mobile station is located in the service area covered by the visitor location register VLR. Therefore, in case a roaming mobile station MS enters this service area, the mobile services switching center MSC informs the associated visitor location register VLR about this roaming mobile station MS.

As is also shown in FIG. 9, to realize the mobile integrated intelligent network the service switching function shown in FIG. 8 may be integrated into the mobile services switching center MSC. Further, the mobile services switching center MSC is interfaced to the service control point 104 to achieve the transparent link between mobility support communication systems, i.e. the intelligent network IN and the mobile cellular network GSM. In other words, the service control point 104 may be implemented as standalone node and the service switching function SSF may be integrated into the mobile services switching center MSC.

FIG. 10 shows the impact of the mobile integrated intelligent network shown in FIG. 9 onto the operation of a pan-European universal railway communication system.

As shown in FIG. 10, the current intelligent network functionality relies on a dedicated service control point 114 for each subscriber being located in the home public land mobile network HPLMN of the subscriber. To illustrate the impact of this approach onto the operation of the mobile integrated intelligent network, FIG. 10 shows a typical example where a train is, e.g., roaming from Spain via France to Germany and is currently cruising France.

In such a case, it might be necessary that a traffic controller wishes to contact the personnel on the train via the local mobile cellular network which is a visitor public land mobile network for the cruising train. Typically, the traffic controller interacts with the train driver via a MSC/VLR and the service switching function integrated therein. Thereafter, the service switching function carries out an access to subscriber record storing the address gsmSPC according to the address of the service control point 114 being located in the home public land mobile network, i.e. in Spain. As this service control point 114 executes control over the services supplied to the train driver in France, this would force the railway operators in both countries to coordinate services on a very detailed and international level which would incur both, costs and delays.

In other words, the switching standards for pan-European railway operator communication systems specify a system which is intended to serve completely different purposes when compared to mobile cellular networks. Here, the focus is not on the individual subscribers but on fulfilling the requirements of the railway companies and their operational necessities such as functional numbering. While generally a mobile integrated network has the objective to support HPLMN services to VPLMN to allow the HPLMN operator to offer a homogeneous service to subscriber, railway operators have a different set of priorities. Their goal is to implement a numbering plan for all subscribers roaming locally under their control.

However, as shown in FIG. 11 being related to different protocols for the exchange of data and services in the mobile integrated intelligent network, this is currently not possible since irrespective of the position of a subscriber either in the home or visited public land mobile network each service switching function gsmSCF implemented in the mobile cellular network always interrogates the same service control point gsmSCF in the home public land mobile network via a intelligent network specific protocol such as the CAP (CAMEL application protocol, CAMEL=Customized Application For Mobile Network Enhanced Logic).

Further, FIG. 11 shows the transaction between the different components of the mobile cellular network GSM illustrated in FIG. 9 via the related protocol, i.e. the MAP (mobile application part protocols). In any visited public land mobile network a train controller taking responsibility for this area will never have the possibility to control a train roaming under his control via a dedicated local service control point but must rely on the control executed through a remote service control point located in the home public land mobile network HPLMN.

Using the unchanged intelligent network architecture shown in FIGS. 9 and 11, respectively, running numbers and coach numbers must be administrated European wide in the home public land mobile network. Further, a functional number re-registration for a roaming train registered in each visited public land mobile network is not supported at all. Also, all railway operators must implement the intelligent network standard and provide appropriate services according to different national requirements. Still further, since one used functional number may not be used elsewhere, this causes a problem for an internationally roaming trains running under the same functional number in different countries.

SUMMARY OF INVENTION

In view of the above, the object of the invention is to provide a mobile integrated intelligent network enabling local control on subscribers roaming in a plurality of public land mobile networks.

According to the present invention, this object is achieved through a service switching means for a mobile integrated intelligent network, comprising interrogation means adapted to receive at least a routable number from a service control means in accordance with a functional number supplied thereto and specifying a subscriber to the mobile integrated intelligent network on a functional level, and an address storage means storing an address of the service control means such that the interrogation is directed to a local service control means in the event of international roaming.

Therefore, the present invention retains to general intelligent networks and standard interfaces, e.g., the CAMEL standard, but introduces a modification of the intelligent network architecture. Instead of interrogating the service control point for internationally roaming subscribers in the home public land mobile network, a local service control point is interrogated. This allows the railway operator to have detailed control over the services of all subscribers in the network, i.e. even with internationally roaming subscribers. In other words, the translation of dialled functional numbers to actual routable numbers is performed locally and also the control of varying services may be handled locally. Here, "locally" means in the same network as the call originator is located in.

According to a preferred embodiment of the present invention, the mobile integrated intelligent network is built on top of the mobile cellular network GSM such that the service switching function is integrated into the related mobile services switching centers MSC. Preferably, the address of the local service control point is stored in the data entry previously pointing to the service control point in the home public land mobile network HPLMN of the subscriber. Therefore, the gsmSCF address that is normally used for the intelligent network is overwritten with the locSCP address which is then used to direct the service control point interrogation to the local service control point. Since a local service control point is interrogated, the railway operator has detailed control over the services provided to the subscribers roaming in his network even in the case of internationally roaming subscribers.

According to further preferred embodiments of the present invention, the overwrite mechanisms are either activated in case subscriber related data is received in the visitor location register or in case call related data is received therein.

Subscriber related data may be data on a lower level such as O-CSI (Originating CAMEL Subscriber Information) data in the context of a call set-up. Further, both overwrite mechanisms may be steered through the IMSI-series of the subscriber, through the A-number, or any other indication defined for this subscriber. After the gmsSCP address is overwritten with the locSCF address, interrogations are performed to the local service control point, however using the standard intelligent network interface, e.g., the CAMEL Application Protocol (=CAP) interface. Therefore, the controlling definition of services is a clearly local issue. Using this mechanism, a very sophisticated selection of the service control point may be realized. This approach even enables the possibility to connect to different local services control point addresses for different subscribers, functional numbers, etc. in dependence on the overwrite mechanism.

This allows for a isuitable administration of available capacities and resources.

According to a further aspect of this invention, the object outlined above is achieved through service control means for a mobile integrated intelligent network, comprising an interface means adapted to link the service control means to a mobile services switching center of a mobile cellular network, a service profile handling means adapted to perform service control for each subscriber with dependency on the registered functional number to the mobile integrated intelligent network, and a routing database means adapted to determine a routable number in accordance with a functional number supplied to service control means and specifying a subscriber to the mobile integrated intelligent network on a functional level.

Therefore, according to this further aspect of the invention the explicit re-registration of a roaming train when entering a new visited public land mobile network is clearly supported. In consequence, as soon as the roaming subscriber roams into a new visited public land mobile network also the related local control will be switched to the operator of this new visited public land mobile network.

BRIEF DESCRIPTION OF DRAWINGS

In the following, preferred embodiments of the present invention will be described with respect to the enclosed drawing in which.

DETAILED DESCRIPTION OF PREFERRED EMBODIMENTS

In the following, different embodiments of the present invention will be described with respect to FIGS. 1 to 6.

Further, the description of mobile integrated intelligent network with respect to FIGS. 8 to 11 is also related to the present invention and will therefore not be repeated here. To the contrary, only modifications on the existing architecture will be described insofar as they have an impact on the present invention.

Figure 1:
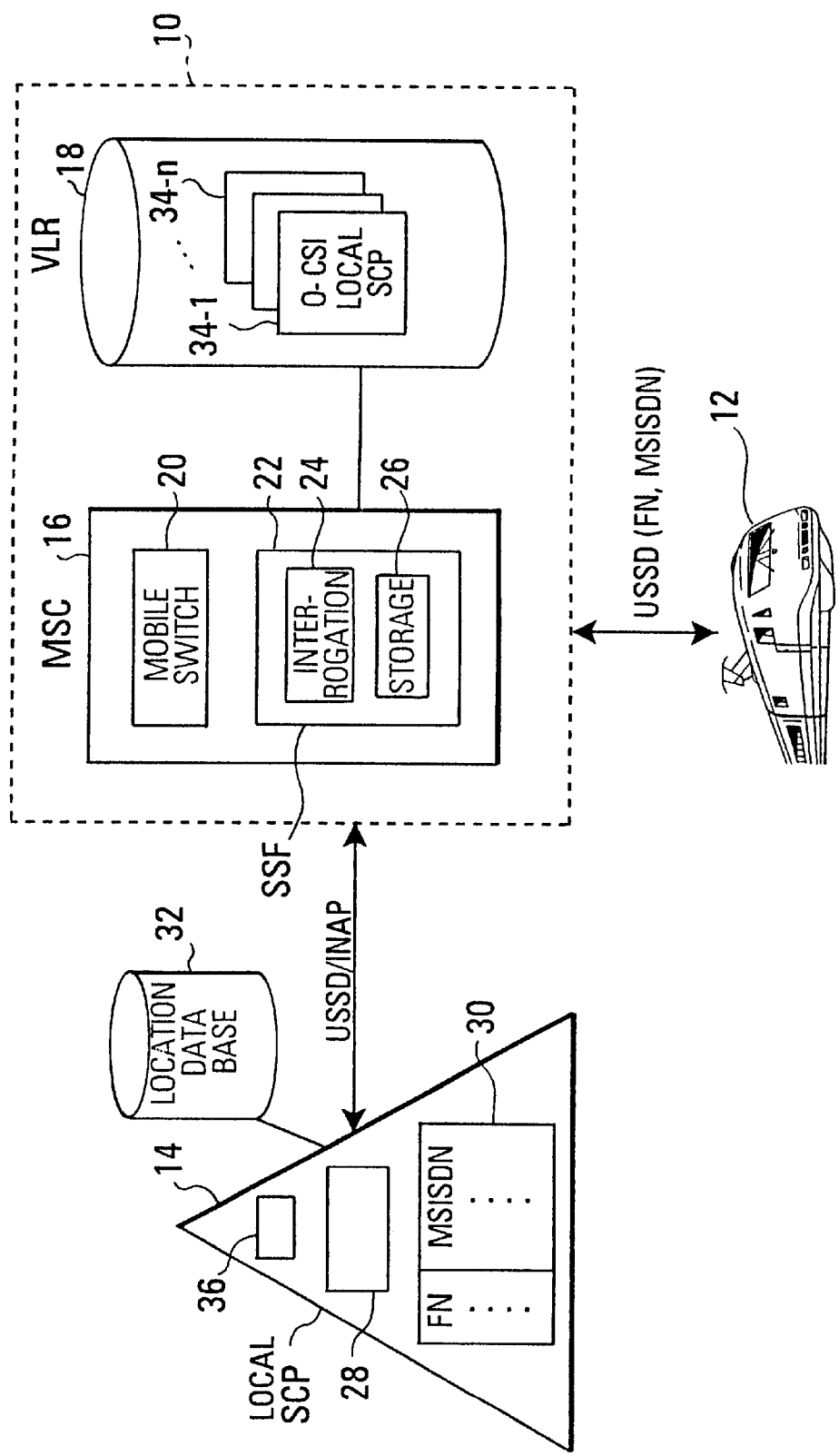
FIG. 1 shows the architecture of the mobile integrated intelligent network with a local service control point according to the present invention.

FIG. 1 shows the architecture underlying the present invention. Here, a local switch 10 establishes a link between a roaming subscriber, e.g., a roaming train 12 and a local service control point 14. The local switch 10 consists of a mobile services switching center 16 and a visitor location register 18 already outlined above. Further, the mobile services switching center 16 comprises a GSM switching unit 20 to implement the usual mobile cellular network GSM functionality and further a service switching function SSF 22 integrated into the mobile services switching center 16. The service switching function unit 22 subdivides into an interrogation unit 24 and an address storage unit 26.

As also shown in FIG. 1, the local service control point 14 comprises an interface 28 for the exchange of service data or instructions with the local switch 10 and a routing database unit 30 wherein a relation between functional numbers and mobile station numbers MSISDN is maintained for a translation process. Preferably, the local service control point 14 is also connected to a location data base 32 wherein location data with respect to the roaming subscriber 12 is stored and updated.

While in FIG. 1 the service switching function unit 22 is shown as being integrated into the mobile services switching center 16, it should be understood that this component may also be provided into a dedicated stand-alone operating component. Still further, the invention is not restricted to the GSM standard but may be flexibly adapted to any existing standard for mobile cellular networks, e.g. the DCS standard or the PCS standard. As also shown in FIG. 1, the address storage unit 26 storing the address of the local service control point 14 may also be omitted in case the related information is stored into subscriber data records 34-1, . . . , 34-n maintained in the visitor location register 18. Further, while the architecture shown in FIG. 1 uses only a single service control point 14 it may be easily be recognized that also a plurality of local service control points for different subscribers may be linked to the local switch 10.

Operatively, an interrogation of the controller running the visited public land mobile network wherein the subscriber or train is roaming is submitted to the mobile services switching center 16 on the basis of functional numbers, as outlined above. Here, the switching unit 20 identifies the submitted number as functional number and forwards this number to the service switching function unit 22 for further processing. In the service switching function unit 22 there is carried out an access to the address storage unit 26 storing the address of the local service control unit 14 such that the interrogation is directed to this local service control unit 14 in the event of international roaming. The interrogation unit 24 then receives a routable number from the local service control point 14 after processing in the local service control point which is then used to forward the interrogation submitted to the mobile services switching center 16 to the roaming train 12.

According to another embodiment the address storage unit 26 is not integrated in the mobile services switching center 16 but is integrated into the visitor location register 18 connected to the mobile services switching center 16. In particular, the address of the local service control point 14 may be stored in subscriber data record maintained in the visitor location register 18. Here, one approach is to store the address of the local service control point 14 into the data entry gsmSFC previously pointing to a service control point in the home public land mobile network HPLMN of the subscriber. This may be achieved using an overwrite mechanism which is activated either when subscriber-related data is received in the visitor location register 18 or in case call-correlated data is received in the visitor location register Alternatively, to identify the address of the local service control point 14 the address of the service control point stored in the data entry gsmSCF pointing to a service control point in the home public land mobile network HPLMN of the subscriber may be ignored and then the address of the local service control point 14 may be read from a general central storage unit. This would require the installation of a central European-wide service control point administrating the functional numbers of all subscribers to the mobile integrated intelligent networks roaming internationally.

As also shown in FIG. 1, besides the interface unit 28 adapted to link the service control point 14 to the mobile services switching center 16 the service control point 14 in addition comprises a service profile handling unit 36 which is adapted to perform service control for each subscriber in dependency on the registered functional numbers stored in the translation table. Also, the routing data base 30 shown in FIG. 1 may be implemented as translation table storing the relation between the functional numbers and the mobile station numbers MSISDN.

While in the above the structure of the mobile integrated intelligent network supporting the interrogation of a local service control point has been explained with respect to FIG. 1 in the following the functionality thereof may be discussed under additional reference to FIGS. 2 to 4.

Generally, calls entering the service switching function unit 22 are previously classified into the IN category. At detection of the IN category, the functional call is routed to the service switching function unit 22 without performing analysis on the functional number and then the local service control point 14 is interrogated to derive a routable number using the routing data base 30.

As already outlined above, this is achieved through access to the address locSCP corresponding to the local service control point 14 being stored either in the address storage unit 26 of the service switching function 22 or in subscriber data records maintained in the visitor location register 18 of the local switch 10. In the latter case, the address of the service control point stored in the data entry gsmSCF pointing to the service control point in the home public land mobile network HPLMN the subscriber is simply ignored. To the contrary, the address of the local service control point 14 is stored in this data entry to achieve the link to the local service control point 14. This may be achieved using an overwrite mechanism which is triggered either upon receipt of the subscriber-related data or call-related data in the visitor location register 18.

Figure 2:
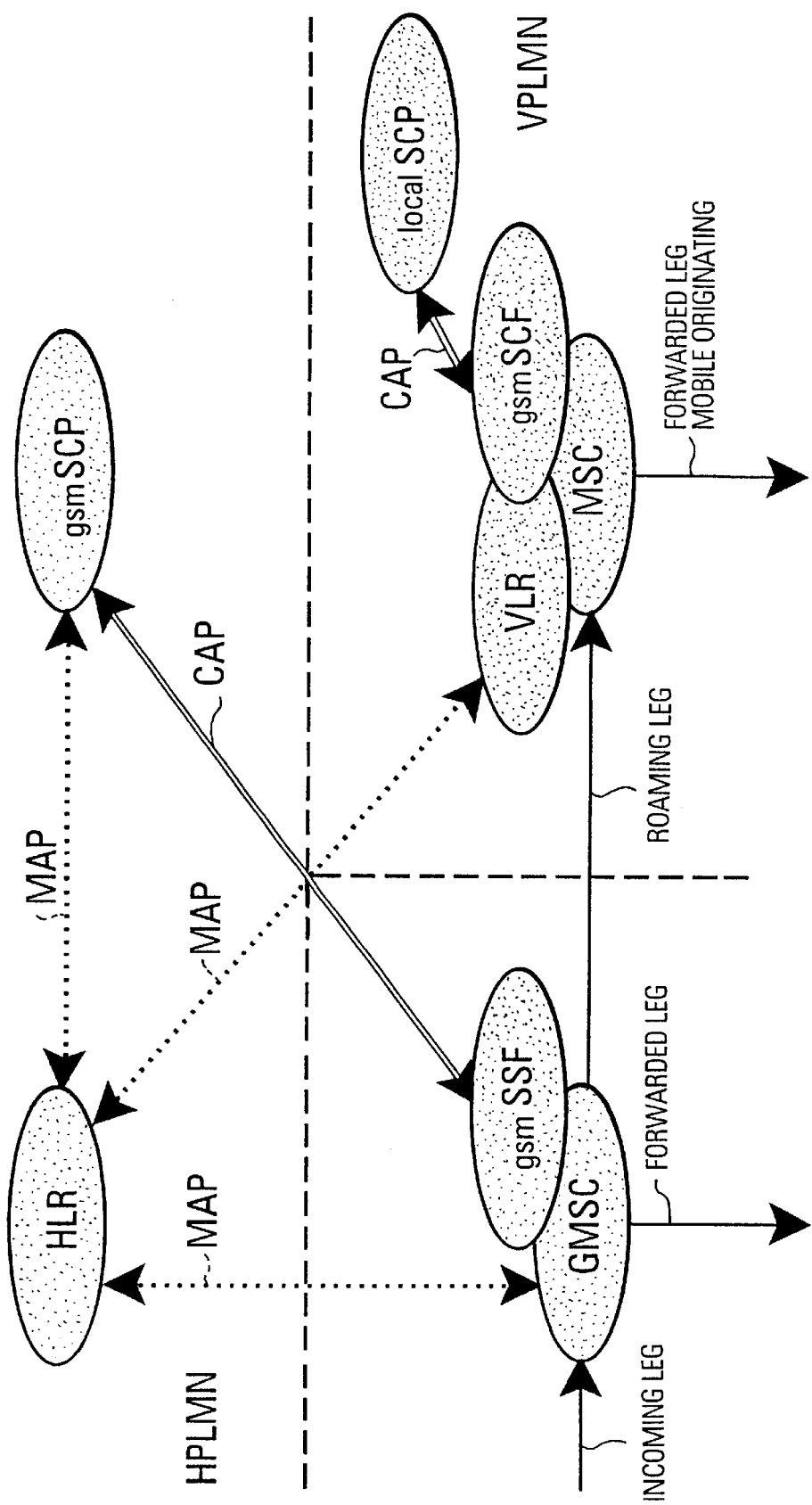
FIG. 2 shows the exchange of data using different protocols between the functional units shown in FIG. 1.

As shown in FIG. 2, contrary to the MAP-(Mobile Application Part-)protocol used in the mobile cellular network according to the GSM standard for the communication between the different functional components residing either in the home or in the visited public land mobile networks the exchange of information with respect to intelligent network functionality is achieved using a different protocol such as the CAP (CAMEL application protocol) according to the CAMEL standard, in particular with respect to the local service control point 14.

Figure 11:
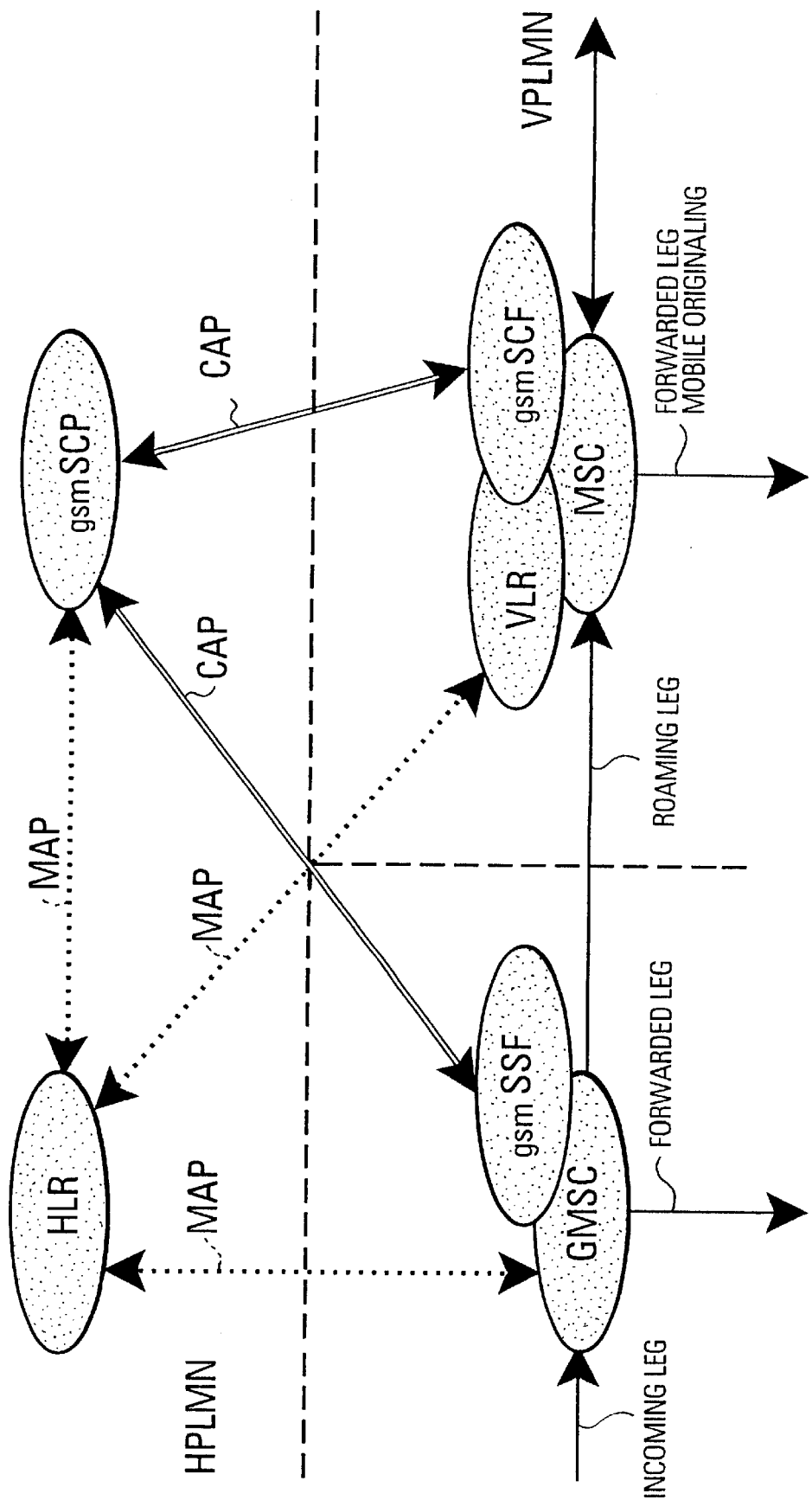
FIG. 11 shows the exchange of data on the basis of different protocols in the pan-European railway operator communication system shown in FIGS. 9 and 10, respectively.

Still further, contrary to the approach outlined with respect to FIG. 11 where a link is shown between the service switching function residing in the visited public land mobile network and the service control point residing in the home public land mobile network according to the present to the present invention this link is re-directed to the local service control point to achieve local control.

Figure 3:
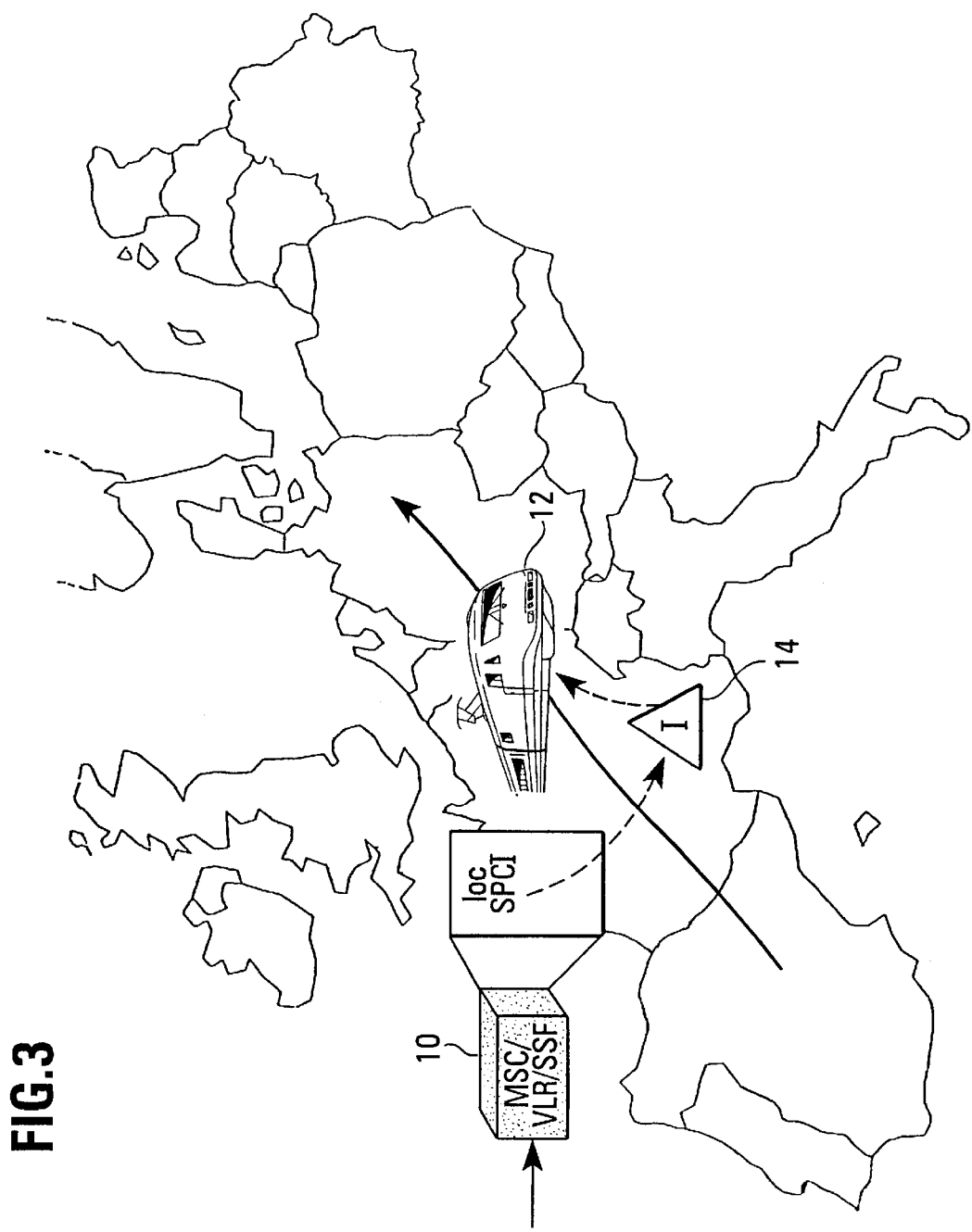
FIG. 3 shows an application scenario of the present invention for an internationally roaming subscriber.

As shown in FIG. 3, this allows to redirect any interrogation of the controller running the railway system in, e.g., France to a local control point 14 also residing in this country. Therefore, a French railway operator is not dependent on the implementation of his regulations, e.g., in Spain. This does not only lead to a reduction of communication transaction and related costs but it also leads to an increased overall safety of the railway operation system.

Another functional aspect of the present invention as relates to the automatic re-registration of roaming subscribers 12 when crossing the borders between different visited public land mobile networks. This re-registration has an impact on the routing data base 30 in the visited public land mobile network which is left and the routing data base in the visited public land mobile network currently being entered.

Figure 4:
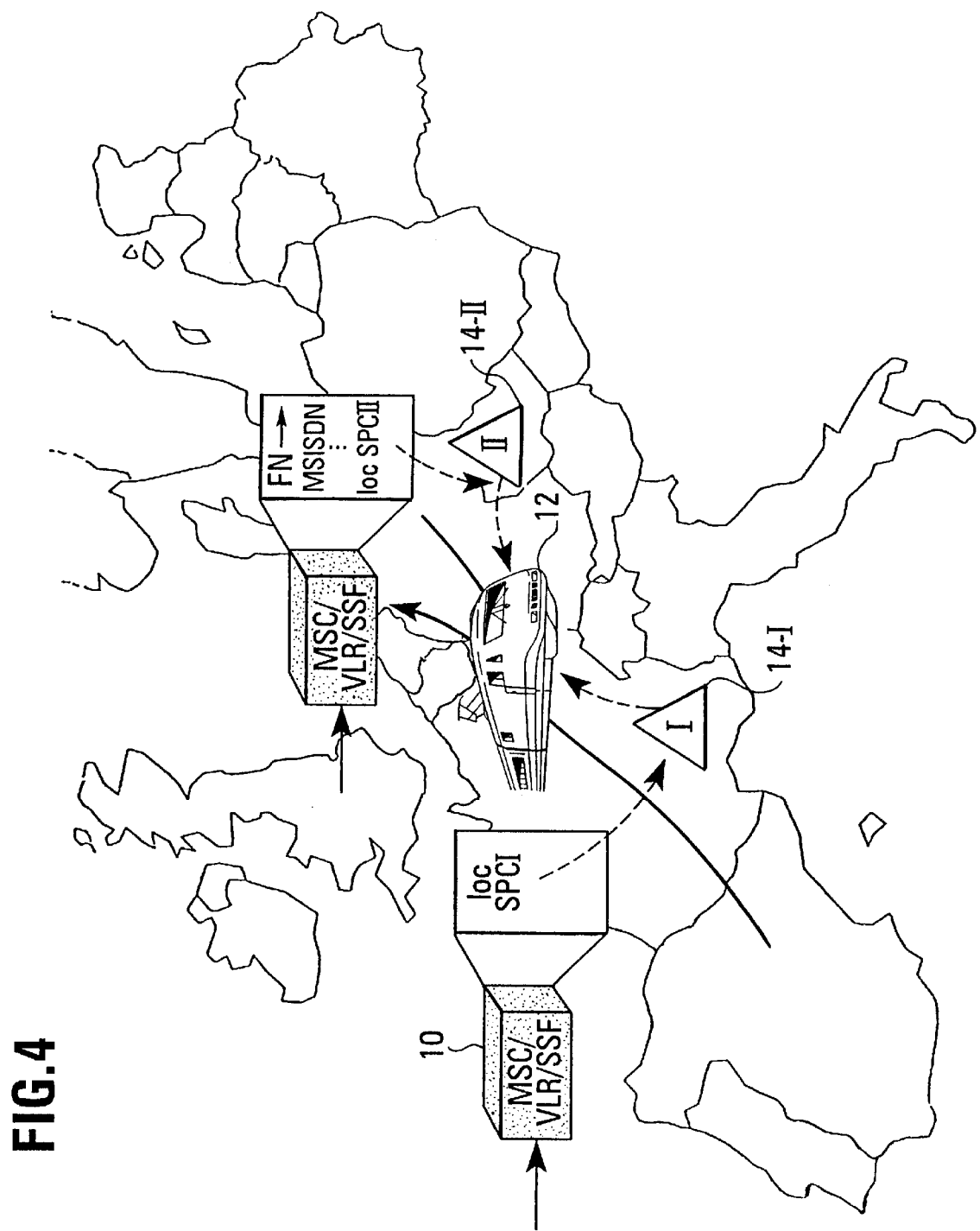
FIG. 4 shows an application scenario for the re-registration of a roaming subscriber when roaming into a new visited public land mobile network.

In particular, as shown in FIG. 4 only this re-registration allows for a full implementation of the local service control point on an international level. The reason for this is that only in case the local service control point is continuously updated in accordance with the railway operator currently taking responsibility it will be possible to implement national regulations on a local level.

As shown in FIG. 4 in the first step, the roaming subscriber sets up a link to the local switch 10 in the new visited public land mobile network to register an entry in the routing data base unit of the related service control unit 14-II. Then, the roaming subscriber sets up another link to the previously activated service control unit 14-I to delete the corresponding entry in the routing data base unit 30 comprised in this previously activated service control unit 14-I. After this, the link is again re-directed to the new visited public land mobile network for further control of the roaming subscriber through the local railway operator, e.g., the German railway operator, as shown in FIG. 4.

The re-registration process illustrated with respect to FIG. 4 guarantees that in each visited public land mobile network all potential roaming subscribers are defined in the related local service control point and that services for visiting subscribers are defined not only for the HPLMN subscribers but also for visiting subscribers. It should be noted that such a re-registration is not only possible between different public land mobile networks but also in the form of an inter-network re-registration. From the viewpoint of a mobile cellular network this means that the re-registration is performed in case a mobile subscriber or train 12 roams into another network, i.e. when the train enters a new MSC/VLR area the routing data base unit 30 might have to register the incoming train 12 with a new running number such that all associated on-board functions are linked to this new running number and the old running number is cancelled.

One option would be a manual re-registration where at entering the MSC/VLR area in the visited new network the subscriber starts a re-register procedure by dialling the routing data base unit of the visited network. Then, the subscriber would be prompted for the necessary functional number information. After successful re-registration, the subscriber will have to re-register towards the network where the train was previously roaming and then the old functional number will be cancelled after a pre-defined time period.

Another option is a terminal type re-registration where at entering the MSC/VLR area of a new network the terminal equipment used in the roaming train notices automatically the change of the railway access code provided for the universal railway communication system and then the local routing data base unit of the newly visited network is informed. Here, the terminal would start to re-register on the basis of the functional information stored in the terminal equipment, e.g., a SIM card. After successful re-registration and expiration of a pre-defined time period, the de-registration will then again automatically be executed through the terminal towards the network wherein the train 12 was previously roaming.

A further option of automatic re-registration is related to the particular case of crossing the geographical network border. Here, the service control point of the visiting network is contacted either by the control management system, the terminal or the driver in that the train is entering the a network and that a re-registration is to be performed. The service control point that received the request for re-registration, i.e. the recipient service control point, will request the service control point in the network wherein the train was previously roaming, i.e. the donor service control point, to hand over the necessary functional data from the on-board functions through an interface between the different service control points. The recipient service control point associates the received functional number information with a newly allocated running number, and the donor service control point will cancel the old running number after a pre-defined time period.

While above the aspects of functional addressing and re-registration have been discussed with respect to the operation of the architecture shown in FIG. 1 in the following reference will be made to the location dependent addressing for calls directed to fixed network users such as a controller taking responsibility for the control of roaming trains.

Here, the location data base 32 shown in FIG. 1 is continuously supplied with updated location information. In particular, the location dependent addressing is provided preliminarily for a train driver to establish a communication path to a train controller in the service area where the train is currently roaming through dialling the functional number of this train controller. When performing such a routing based on location information, the routing data base provides the location information. Here, this information may be either generated through the terminal roaming with the train 12, the GSM location register such as HLR, VLR or by some external location information data base which is constantly updated through a railway positioning system, e.g., GPS. For a routing based on location information, the location information must be available at call set-up from the location data base 32 to determine the train controller that is, e.g., nearest to the current position of the roaming subscriber.

As shown in FIG. 1, during operation of the inventive mobile integrated intelligent network in the sense outlined above data may be exchanged between the local switch 10 and either the roaming train 12 or the local service control point 14 on the basis of unstructured supplementary service data dialogues USSD specified in ETSI Technical Specification 2.90/prETS 30625, 3.90/prETS 30549, and 4.90/prETS 305172 as dedicated mechanism to exchange information between a mobile station MS and a network application running in the mobile cellular network, in particular the GSM mobile cellular network. As also shown in FIG. 1, between the local service control point 14 and the local switch 10 data may in addition be exchanged using the INAP protocol, i.e. the intelligent network application protocol.

Finally, the present invention also enables a combination of the local service control point concept with a previously established solution to provide local services being referred to as HLR "follow-me" as will be shown in following.

Within this HLR "follow-me" solution, the mapping of a functional number into a routable number is not achieved in a local service control point but in a home location register being located, e.g., via the visited public land mobile network.

Figure 5:
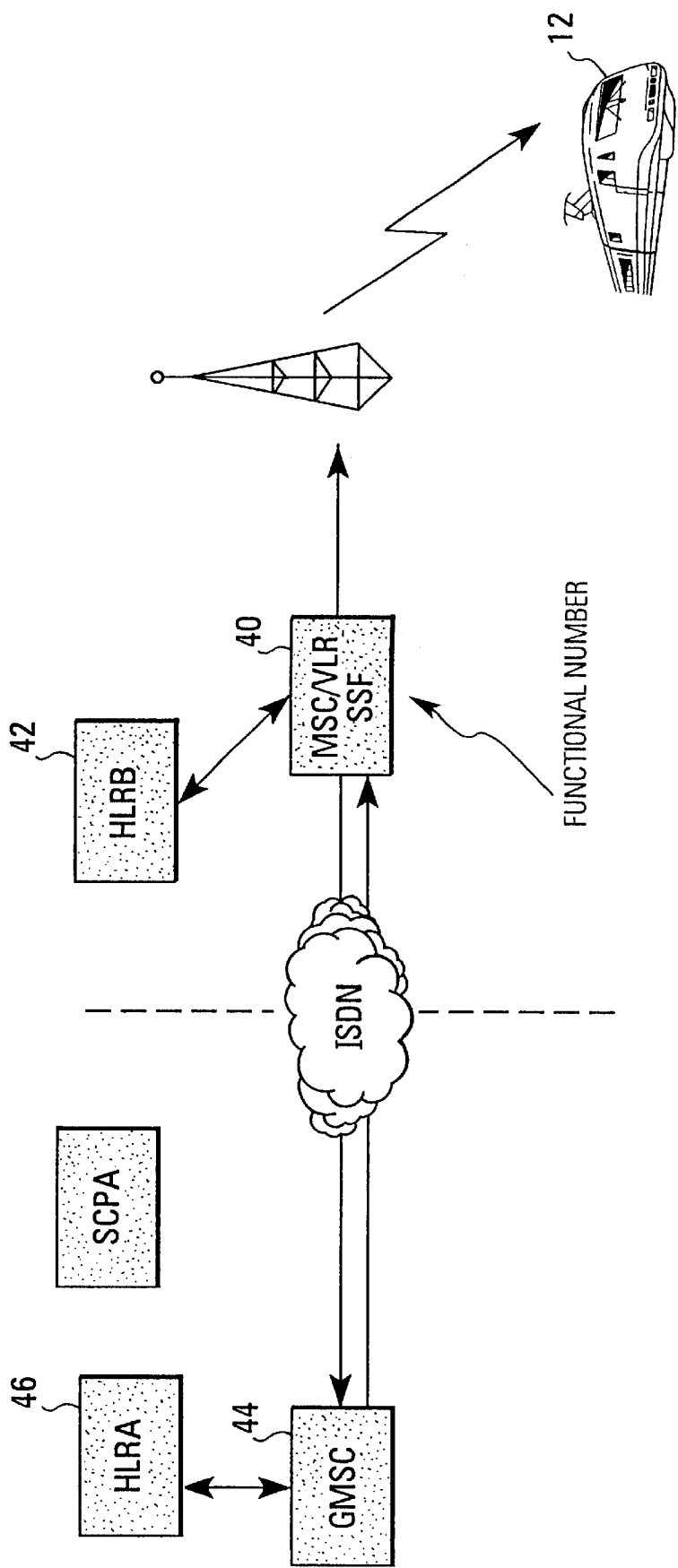
FIG. 5 shows a first example for the inter-networking between the mobile integrated intelligent network and a HLR-based solution to the pan-European railway operator communication system.

A first case shown in FIG. 5 relates to the provision of a local service control point in the home public land mobile network and the provision of a HLR "follow-me" solution in a visited public land mobile network. In such a case, the interaction is possible since a IN subscriber can nevertheless receive calls with functional numbers being translated to a routable MSISDN through a HLR based number translation implementation. For the example shown in FIG. 5, the functional number is, e.g., supplied to the MSC/VLR-SSF and then the home location register 42 executes "follow-me", i.e. call forwarding to the MSISDN number. Then, the call is re-routed to the gateway mobile service switching center GMSC 44 in the home public land mobile network and normal HLR interrogation is commenced at the further home location register HLRA 46 based on the real MSISDN which afterwards enables normal GSM roaming re-routing and call set-up.

Figure 6:
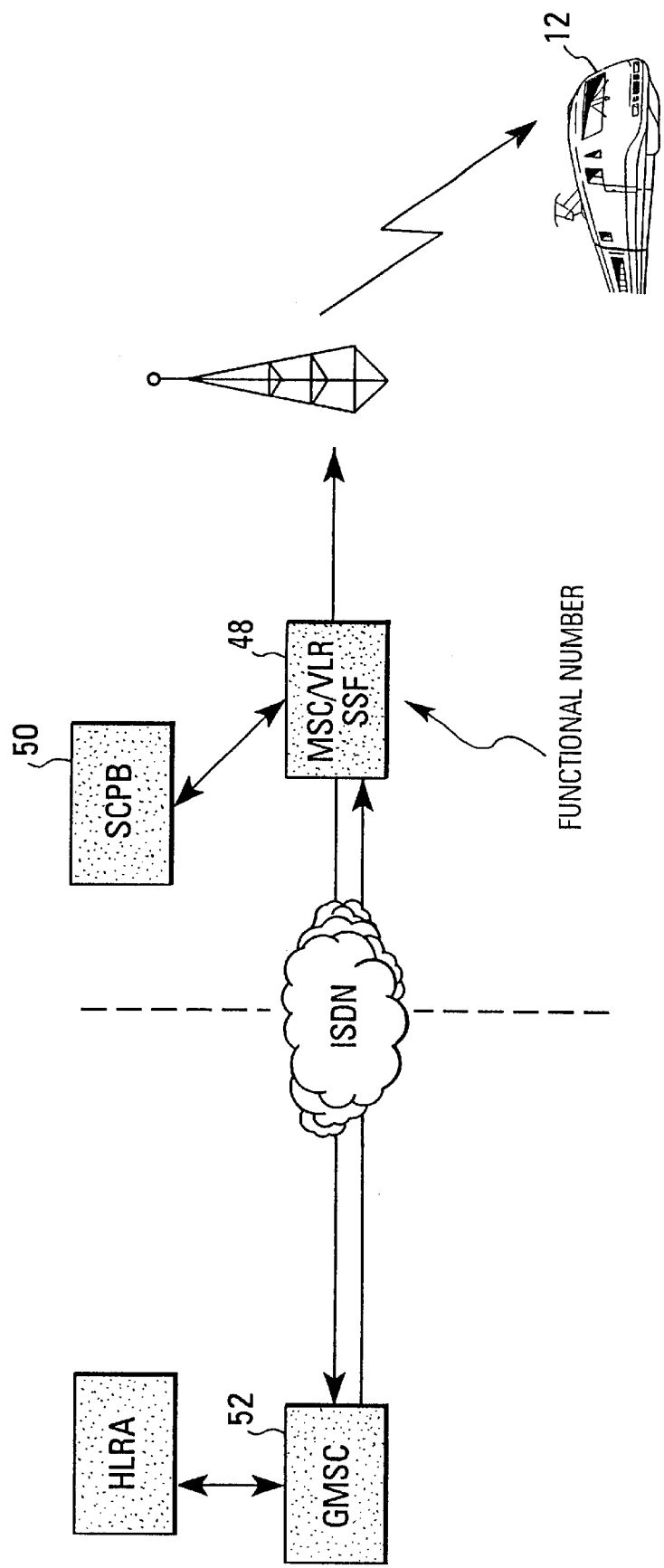
FIG. 6 shows a second example for the inter-networking between the mobile integrated intelligent network and a HLR-based solution.
Figure 7:
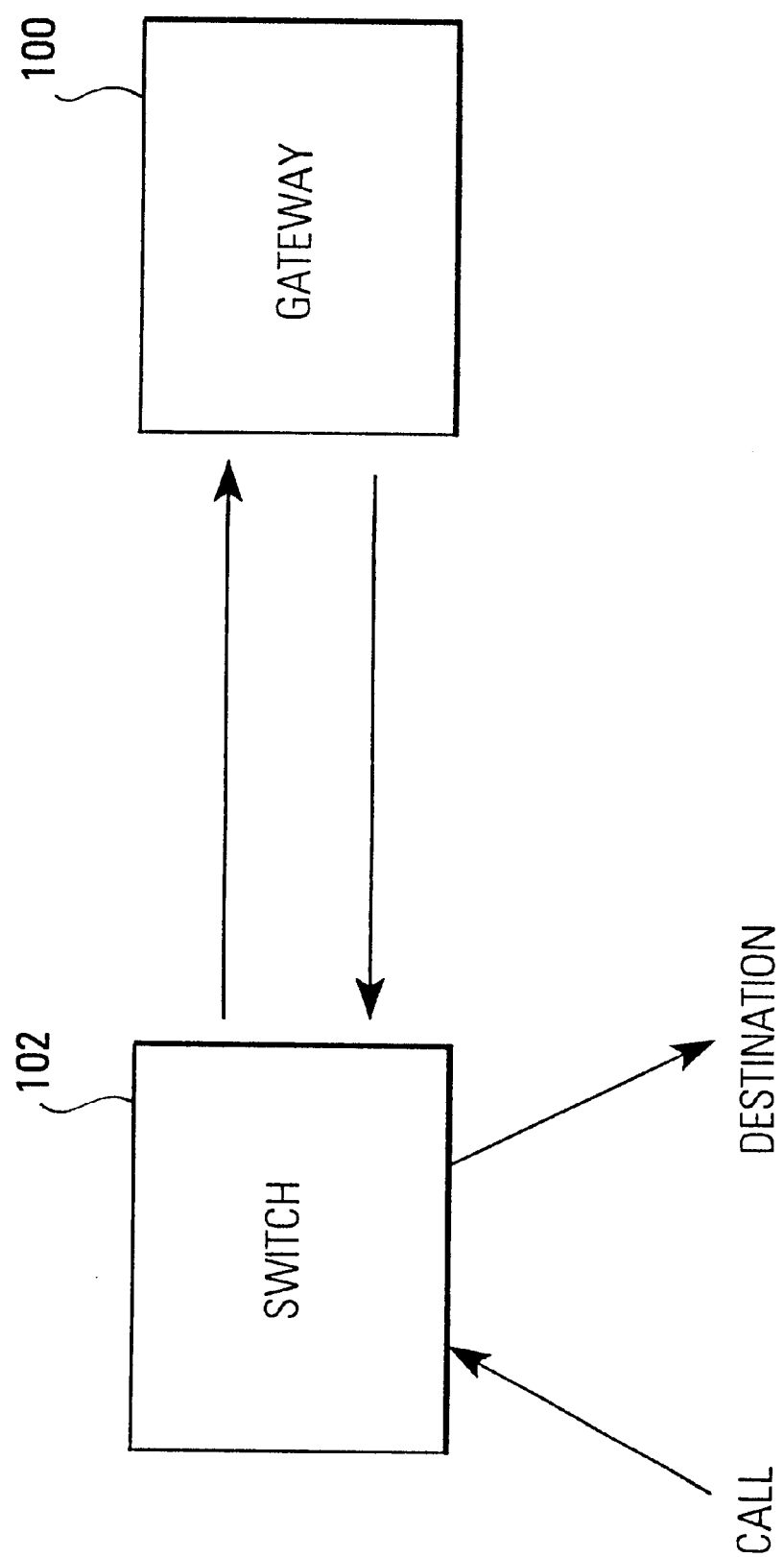
FIG. 7 shows the gateway node concept originally specified for the pan-European universal railway communication system.
Figure 8:
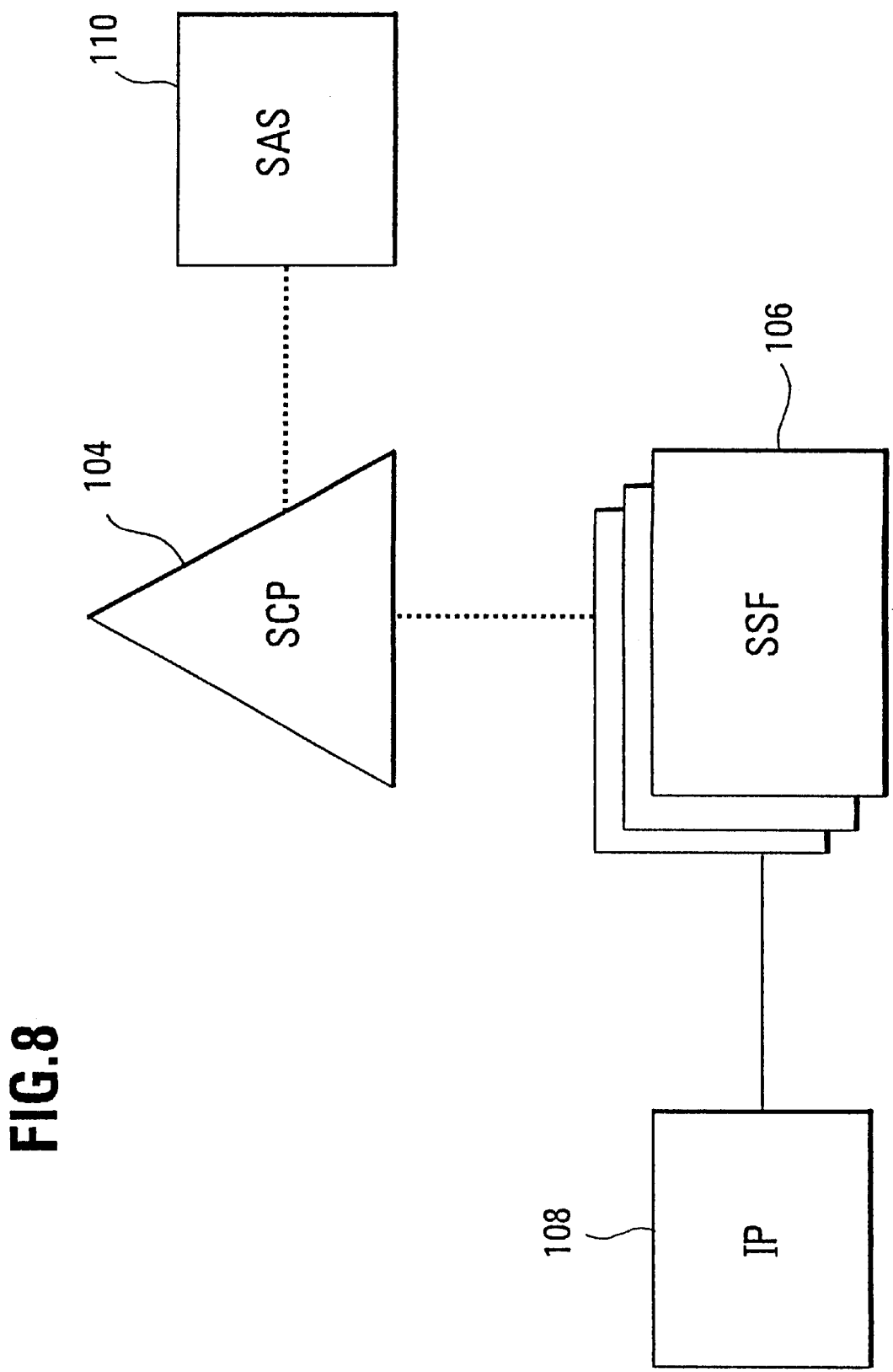
FIG. 8 shows the general architecture for an intelligent network communication system.
Figure 9:
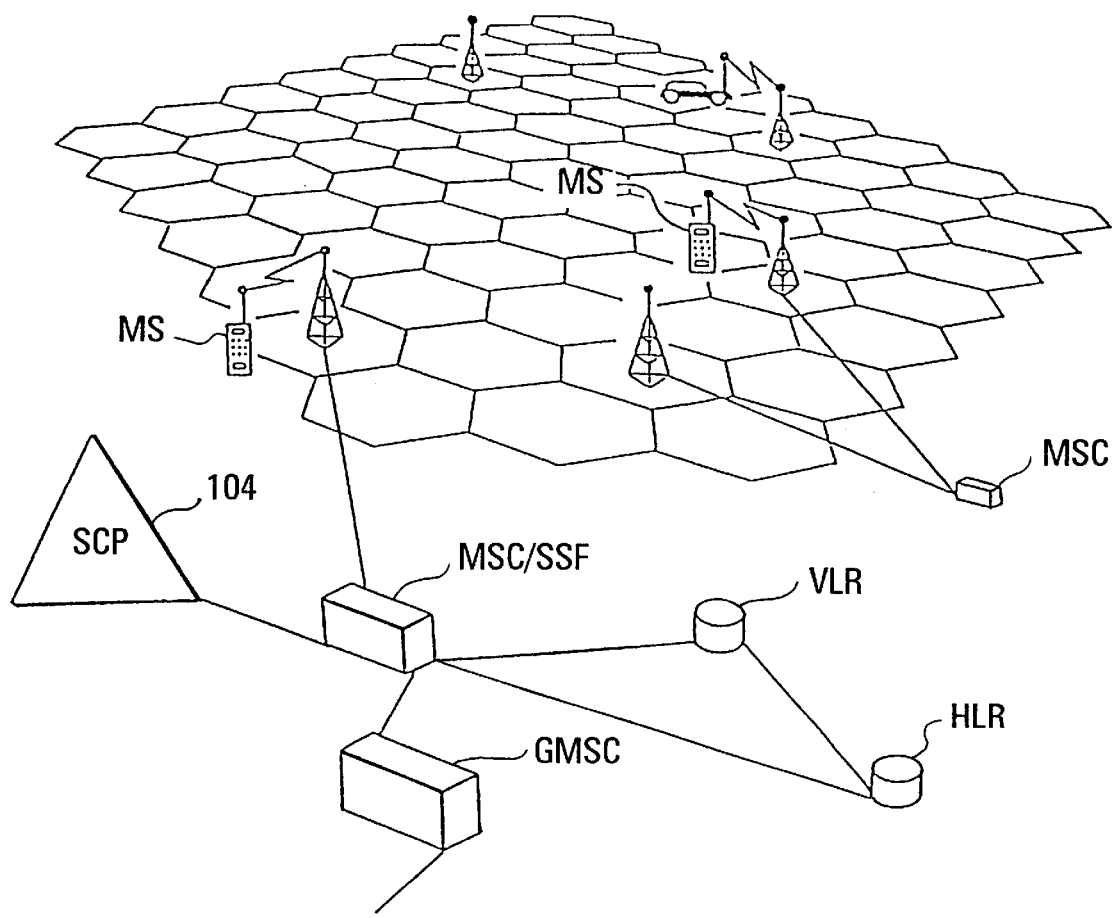
FIG. 9 shows one option to integrate the general architecture for the intelligent network communication system shown in FIG. 8 into a mobile cellular network, e.g., the GSM mobile cellular network.
Figure 10:
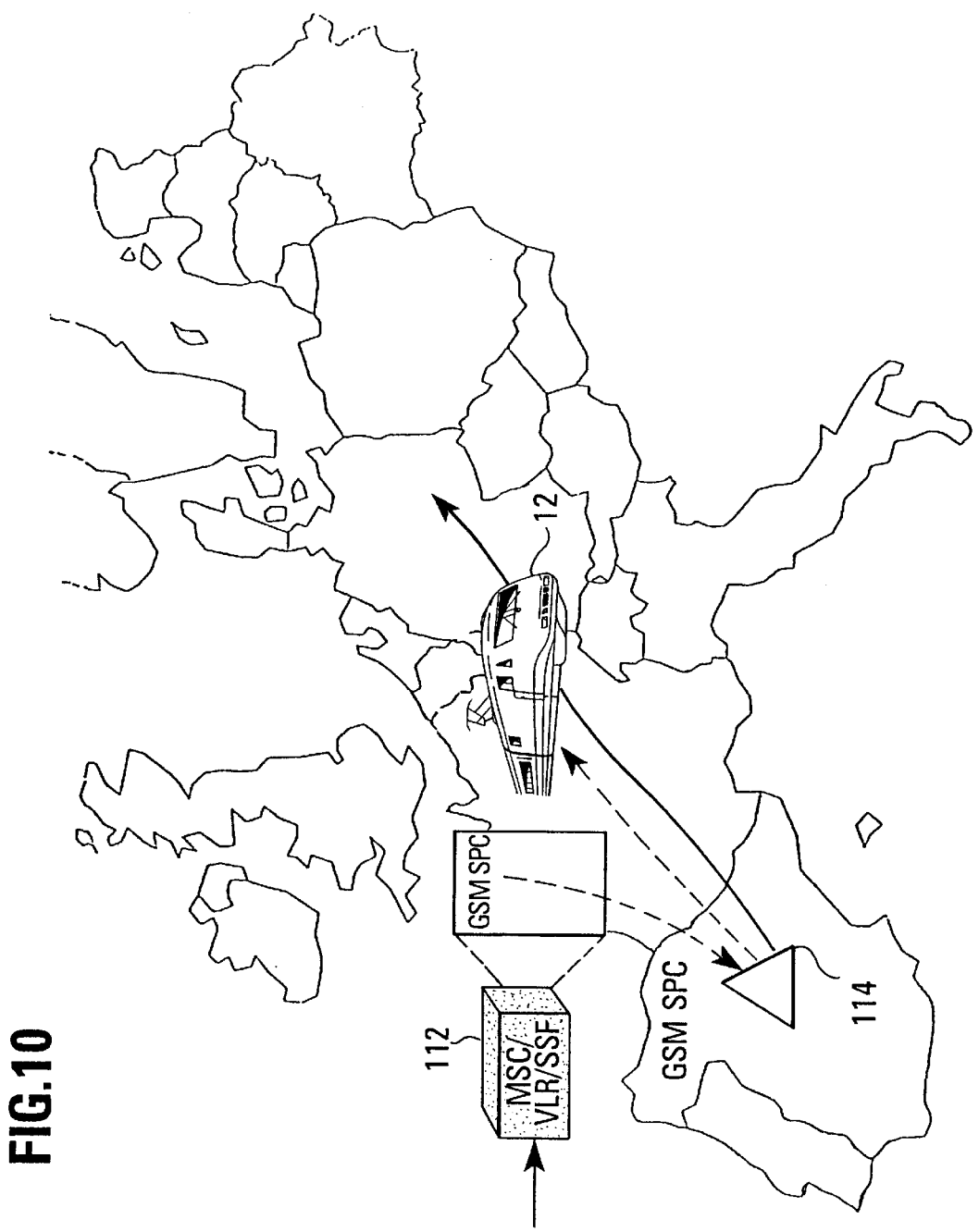
FIG. 10 shows the application of the mobile integrated intelligent network shown in FIG. 9 to a pan-European railway operator communication system without local control.

FIG. 6 relates to a co-pending case where the home public land mobile network supports HLR "follow-me" and the visitor public land mobile network supports the local service control point concept. Here, in case a controller dials a functional number being submitted to the local switch 48, the translation takes place in the related service control point 50. Then, the call is re-routed to the gateway mobile service switching center GMSC in the home public land mobile network. Then, normal HLR interrogation is commenced on the basis of the real MSISDN followed by normal GSM roaming re-routing and call set-up.

Further, according to the present invention it is also possible to coordinate the local SCP concept and the remote SCP concept outlined with respect to the prior art. Heretofore, a local SCP control flag is introduced in the home location register of the home public land mobile network HPLMN of the roaming subscriber. This local SCP control flag may be used by the HPLMN service provider to restrict the VPLMN service provider to serve roaming subscribers with local IN services. Thus, this flag makes the local SCP concept compatible with the remote SCP concept in CAMEL.

What is claimed is:

1. A service switching means for a mobile integrated intelligent network, comprising:

a) interrogation means for receiving at least a routable number from a railway operator service control means in accordance with a functional number supplied thereto and for specifying a subscriber to the mobile integrated intelligent network on a functional level, and b) an address storage means for storing an address of said railway operator service control means such that the interrogation is redirected to a local railway operator service control means in the event of international roaming, wherein the address of said local railway operator service control means is stored in subscriber data records, respectively, and wherein the address of said local railway operator service control means is stored in a data entry previously pointing to a service control means in a home public land mobile network of the subscriber using an overwrite mechanism, respectively.

2. The service switching means of claim 1, wherein the intelligent network is integrated into a mobile cellular network.

3. The service switching means of claim 2, wherein the service switching means is integrated into each mobile services switching center of said mobile cellular network.

4. The service switching means of claim 3, wherein said address storage means is integrated into a visitor location register connected to each mobile services switching center.

5. The service switching means of claim 1, wherein the overwrite mechanism is activated when receiving subscriber-related data.

6. The service switching means of claim 1, wherein said overwrite mechanism is activated when receiving call-related data.

7. The service switching means of claim 1, wherein the direction of interrogation to said local railway operator service control means is enabled in case a local SPC control Rag is set in a home location register of the home public land mobile network of the roaming subscriber.

8. A service switching means for a mobile integrated intelligent network, comprising:

a) interrogation means for receiving at least a routable number from a railway operator service control means in accordance with a functional number supplied thereto and for specifying a subscriber to the mobile integrated intelligent network on a functional level, and b) an address storage means for storing an address of said railway operator service control means such that the interrogation is redirected to a local railway operator service control means in the event of international roaming, wherein the address of said local railway operator service control means is stored in subscriber data records, respectively, and wherein the address of said local railway operator service control means stored in a data entry pointing to a service control means in a home public land mobile network of a subscriber is ignored and wherein the address of said local railway operator service control means is read from a general central storage means.

9. A service switching means for a mobile integrated intelligent network, comprising:

a) interrogation means for receiving at least a routable number from a railway operator service control means in accordance with a functional number supplied thereto and for specifying a subscriber to the mobile integrated intelligent network on a functional level, b) an address storage means for storing an address of said railway operator service control means such that the interrogation is redirected to a local railway operator service control means in the event of international roaming, c) an interface means for linking the local railway operator service control means to a mobile services switching center of a mobile cellular network, d) a service profile handling means for performing service control for each subscriber with dependency on a registered functional number to the mobile integrated intelligent network, and e) a routing database means for determining a routable number in accordance with a functional number supplied to said local railway operator service control means and for specifying a subscriber to the mobile integrated intelligent network on a functional level.

10. The service switching means of claim 9, wherein an automatic re-registration in said routing database means is performed each time a subscriber crosses the geographical borders of a service area of a service control means.

11. The service control means according to claim 9, wherein automatic re-registration in said routing database means is performed through terminal support.

12. The service control means according to claim 9, wherein re-registration is performed through exchange of unstructured supplementary service data between said subscriber and the local railway operator service control means.

13. The service control means according to claim 9, wherein the local railway operator service control means is adapted to perform routing on the basis of location information stored in a location database means.

14. The service control means according to claim 13, wherein said location database means is permanently updated using information provided by at least one location information source selected from a group consisting of subscriber terminal, mobile cellular network location registers, and external positioning system, respectively.

* * * * *